United States Patent
Freudenschuss et al.

(10) Patent No.: US 9,766,898 B2
(45) Date of Patent: Sep. 19, 2017

(54) OPERATING METHODS FOR A COMPUTER SYSTEM AND COMPUTER SYSTEM

(71) Applicant: Fujitsu Technology Solutions Intellectual Property GmbH, Munich (DE)

(72) Inventors: Reinhold Freudenschuss, Augsburg (DE); Bernhard Vogl, Merching (DE); Stephan Schneider, Aletshausen (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 190 days.

(21) Appl. No.: 14/350,840

(22) PCT Filed: Oct. 8, 2012

(86) PCT No.: PCT/EP2012/069870
§ 371 (c)(1),
(2) Date: Apr. 10, 2014

(87) PCT Pub. No.: WO2013/053672
PCT Pub. Date: Apr. 18, 2013

(65) Prior Publication Data
US 2014/0258702 A1   Sep. 11, 2014

(30) Foreign Application Priority Data
Oct. 13, 2011   (DE) .......................... 10 2011 115 853

(51) Int. Cl.
*G06F 9/44* (2006.01)
*G06F 11/22* (2006.01)

(52) U.S. Cl.
CPC ........ *G06F 9/4401* (2013.01); *G06F 11/2247* (2013.01)

(58) Field of Classification Search
CPC .. G06F 9/4401; G06F 11/2247; G06F 9/4403; G06F 9/4405
See application file for complete search history.

(56) References Cited

U.S. PATENT DOCUMENTS 6,477,482 B1 * 11/2002 Maupin ............... G06F 11/2284
                                                      702/183
7,111,083 B2 *  9/2006 Miller ................... G06F 9/4401
                                                       710/10

(Continued)

FOREIGN PATENT DOCUMENTS

JP       61-23729        2/1986
JP    2006-252329        9/2006

(Continued)

OTHER PUBLICATIONS http://www.comptechdoc.org/hardware/pc/pcboot.html, "The Booting Process of the PC", Jan. 23, 2002.*

(Continued)

*Primary Examiner* — Fahmida Rahman
(74) *Attorney, Agent, or Firm* — DLA Piper LLP (US)

(57) ABSTRACT

An operating method for a computer system having system firmware and an operating element to switch on the computer system includes monitoring the operating element for an actuation, immediately after starting actuation of the operating element, performing a first part of a boot sequence, determining a time period for which the operating element is actuated, executing a remaining part of full boot sequence with the system firmware if the determined time period exceeds a predetermined time period, where the full boot sequence includes activation of a keyboard and mouse through the firmware, and executing a remaining part of limited boot sequence with the system firmware if the determined time period does not exceed the predetermined (Continued)

time period, wherein the limited boot sequence does not include at least one of activation of a keyboard and mouse through the firmware.

22 Claims, 3 Drawing Sheets

(56) References Cited

U.S. PATENT DOCUMENTS

| | | |
|---|---|---|
| 2006/0064571 A1 | 3/2006 | Tseng |
| 2006/0212550 A1* | 9/2006 | Oda .................. G06F 9/4411 |
| | | 709/220 |
| 2011/0161646 A1 | 6/2011 | Yu et al. |
| 2012/0166780 A1* | 6/2012 | Ziarnik ............... G06F 9/4401 |
| | | 713/1 |

FOREIGN PATENT DOCUMENTS

| | | |
|---|---|---|
| JP | 2006-259903 | 9/2006 |
| WO | 2011/115621 A1 | 9/2011 |

OTHER PUBLICATIONS http://www.pcguide.com/ref/mbsys/bios/bootSequence-c.html, Contact Center Trends: System boot sequence, Apr. 17, 2001, The PC Guide.*

English translation of the Notice of Reasons for Rejection dated May 12, 2015 of corresponding Japanese Application No. 2014-535018.

* cited by examiner

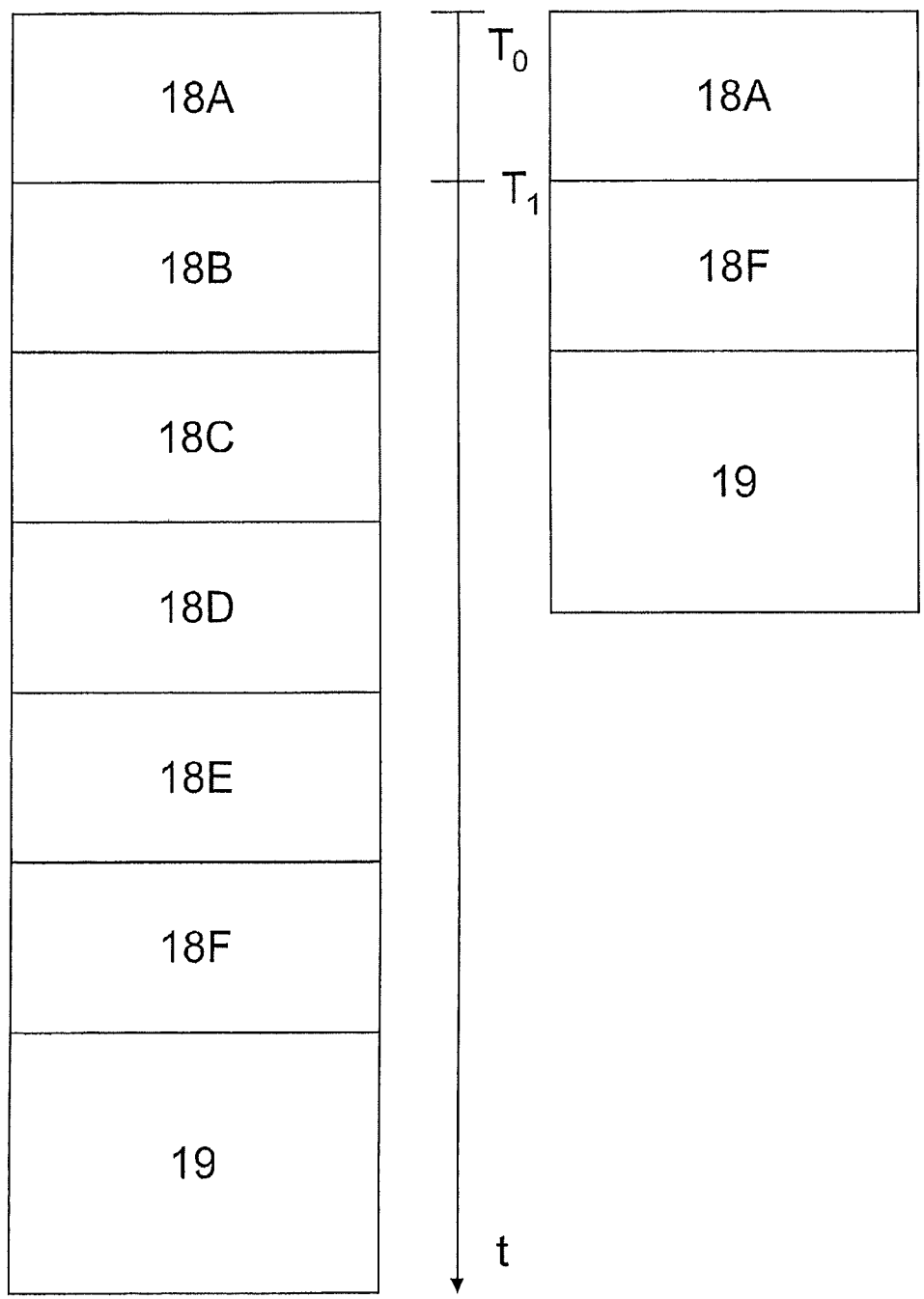

OPERATING METHODS FOR A COMPUTER SYSTEM AND COMPUTER SYSTEM

TECHNICAL FIELD

This disclosure relates to an operating method for a computer system having system firmware and an operating element to switch on the computer system. The disclosure further relates to a computer system that carries out the method and comprises at least one operating element to switch on the computer system.

BACKGROUND

The known computer systems such as, for example, PC desktop systems or laptops, normally execute a multi-step start-up process. In a first phase, which is normally referred to as a power-on self-test (POST), a fundamental initializing and testing of the hardware used is carried out under the control of system firmware stored in a non-volatile memory chip. In that phase, for example, the size of the existing main memory is determined and, optionally, the functionality thereof is checked. Upon a corresponding request from a user, in that phase, low-level adjustments can be made via a settings dialogue of the system firmware. In a subsequent phase, the actual operating system is loaded from a storage medium of the computer system. Additional operating system-specific driver modules for individual components of the computer system are also re-loaded and initialized in that phase.

One problem of known computer systems is that the start-up procedure takes a comparatively long time. Users consider this to be an annoyance and, as a result, computer systems are often not switched off.

It could therefore be helpful to provide computer systems and operating methods for computer systems that accelerate start-up procedures of the computer systems.

SUMMARY

We provide an operating method for a computer system having system firmware and an operating element to switch on the computer system including monitoring the operating element for an actuation; immediately after starting an actuation of the operating element, performing a first part of a boot sequence; determining a time period (T) for which the operating element is actuated; executing a remaining part of full boot sequence with the system firmware if the determined time period (T) exceeds a predetermined time period (S), where the full boot sequence includes at least one of activation of a keyboard and mouse of the computer system through the firmware; and executing a remaining part of limited boot sequence with the system firmware if the determined time period (T) does not exceed the predetermined time period (S), wherein the limited boot sequence does not include at least one of activation of a keyboard and mouse of the computer system through the firmware.

We also provide an operating method for a computer system having system firmware and an operating element to switch on the computer system including monitoring the operating element for an actuation; determining a time period (T) for which the operating element is actuated; executing a full boot sequence with the system firmware if the determined time period (T) exceeds a predetermined time period (S); and executing a limited boot sequence with the system firmware if the determined time period (T) does not exceed the predetermined time period (S).

We further provide a computer system including an operating element that switches on the computer system; a monitoring circuit that monitors the at least one operating element for actuation; at least one non-volatile memory that stores system firmware including first executable program code; and at least one data processing device that executes executable program code, wherein a first subset of the executable program code that executes a full boot sequence of the computer system by the data-processing device is executed if the monitoring circuit indicates that the operating element was actuated for a predetermined time period (S), and a second subset of the executable program code that executes a limited boot sequence of the computer system by the data-processing device is executed if the monitoring circuit indicates that the operating element was operated for a time period (T) shorter than the predetermined time period (S).

BRIEF DESCRIPTION OF THE DRAWINGS

FIG. 4 shows a schematic representation of different boot sequences.

LIST OF REFERENCE SIGNS

Figure 1:
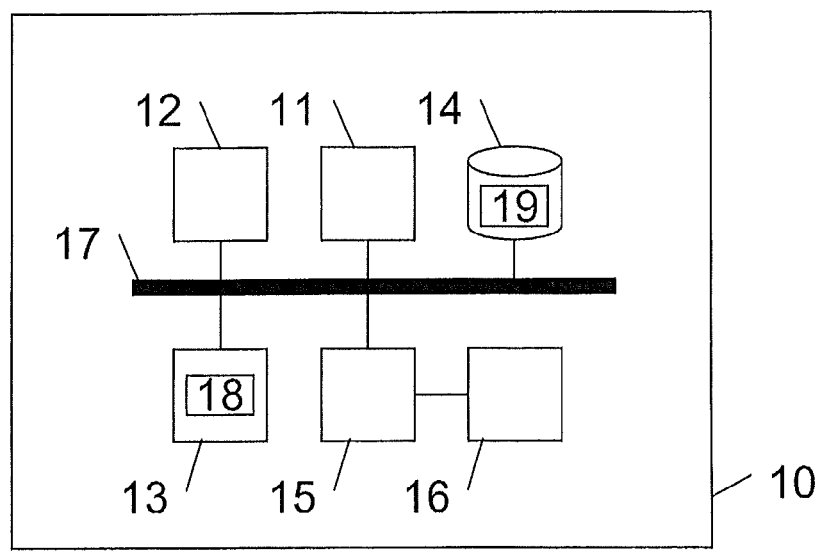
FIG. 1 shows a block diagram of a computer system.

10 Computer system
11 Processor
12 Working memory
13 Non-volatile memory chip
14 Hard disk drive
15 Input/output module
16 Push button
17 System bus
18 System firmware
18A-18F Firmware components
19 Operating system
20 First operating method for a computer system
21-26 Method steps
30 Second operating method for a computer system
31-42 Method steps
43 Full boot sequence
44 Limited boot sequence
T Time period
S Predetermined time period
$T_0$ First time
$T_1$ Second time

DETAILED DESCRIPTION

We provide an operating method for a computer system with system firmware and an operating element to switch on the computer system. The operating method may comprise:
monitoring the operating element for an actuation;
immediately after the start of an actuation of the operating element, performing a first part of a boot sequence;
determining a time period for which the operating element is actuated;
executing a remaining part of full boot sequence with the system firmware if the determined time period exceeds a predetermined time period, where the full boot sequence comprises at least one of activation of a keyboard and mouse of the computer system through the firmware; and executing a remaining part of limited boot sequence with the system firmware if the determined time period does not exceed the predetermined time period, wherein the limited boot sequence does not comprise at least one of activation of a keyboard and mouse of the computer system through the firmware.

We also provide an operating method for a computer system with system firmware and an operating element to switch on the computer system. The operating method may comprise:

monitoring the operating element for an actuation;

determining a time period for which the operating element is actuated;

executing a full boot sequence with the system firmware if the determine time period exceeds a predetermined time period; and executing a limited boot sequence with the system firmware if the determined time period does not exceed the predetermined time period.

This allows for omission of the running of parts of system firmware if they are not needed for a normal boot procedure of the computer system to accelerate starting of the computer system. However, if necessary, it must be possible to activate in a simple manner such parts of a system firmware not always needed. For that purpose the length of time for which the operating element is actuated determines whether a limited or full boot sequence is performed. For example, program code that initializes an input component can only be executed if a settings dialogue of the system firmware is to be called up.

We further provide a computer system comprising at least one operating element to switch on the computer system. The computer system has at least one monitoring circuit to monitor the at least one operating element for actuation. Furthermore, the computer system has at least one non-volatile memory to store system firmware. The computer system has at least one data-processing device that executes executable program code, wherein a first subset of the executable program code to execute a full boot sequence of the computer system by the data-processing device is executed if the monitoring circuit indicates that the operating element was actuated for a predetermined time period. To execute a limited boot sequence of the computer system, a second subset of the executable program code is executed if the monitoring circuit indicates that the operating element was actuated for a time period shorter than the predetermined time period.

Such a computer system that selectively executes first or second executable program code to execute a full or limited boot sequence, respectively, is likewise suitable to accelerate the start-up procedure. As in the first operating method example, duration of an actuation of the operating element decides whether the computer system is started in an accelerated manner by executing the second executable program code or whether a full boot sequence is carried out by calling up the first executable program code.

Different examples are described hereinafter with reference to the Drawings.

The block diagram according to FIG. 1 schematically shows a computer system 10. The computer system 10 comprises a processor 11, a working memory 12 and a non-volatile memory chip 13. The computer system 10 further comprises a hard disk drive 14, a general-purpose input/output module 15 (GPIO) and an operating element in the form of a push button 16 connected to an input of the input/output module 15. The components 11 to 15 of the computer system 10 interconnect via a system bus 17. Instead of the system bus 17 schematically shown in FIG. 1, it is, of course, also possible for a plurality of different bus systems or other connections to be used to connect individual components of a computer system.

The processor 11 serves to execute program code stored in the working memory 12 or the memory chip 13. At least one system firmware 18 is filed in the non-volatile memory chip 13 and used inter alia to start up the computer system 10. The system firmware 18 is, for example, what is known as a BIOS (Basic Input/Output System) program or firmware according to the (Unified) Extensible Firmware Interface (UEFI or EFI) standard. Further executable program code, in particular the program code of an operating system 19, is stored on the hard disk drive 14.

In what is commonly called a standby mode, the input/output module 15 is supplied with a standby voltage and monitors the push button 16 for actuation. If the push button 16 is actuated, the computer system 10 is started by applying a supply voltage to the remaining components 11 to 14 of the system. In this process, first, the processor 11 executes what is commonly called a boot block of the system firmware 18 from the non-volatile memory 13. Then, further executable program code of the system firmware 18 is executed either directly from the non-volatile memory 13 or copied from there into the working memory 12 and then executed by the processor 11. After the system firmware 18 has been executed, executable code of the operating system 19 is loaded from the hard disk drive 14 into the working memory 12 and executed by the processor 11.

Figure 2:
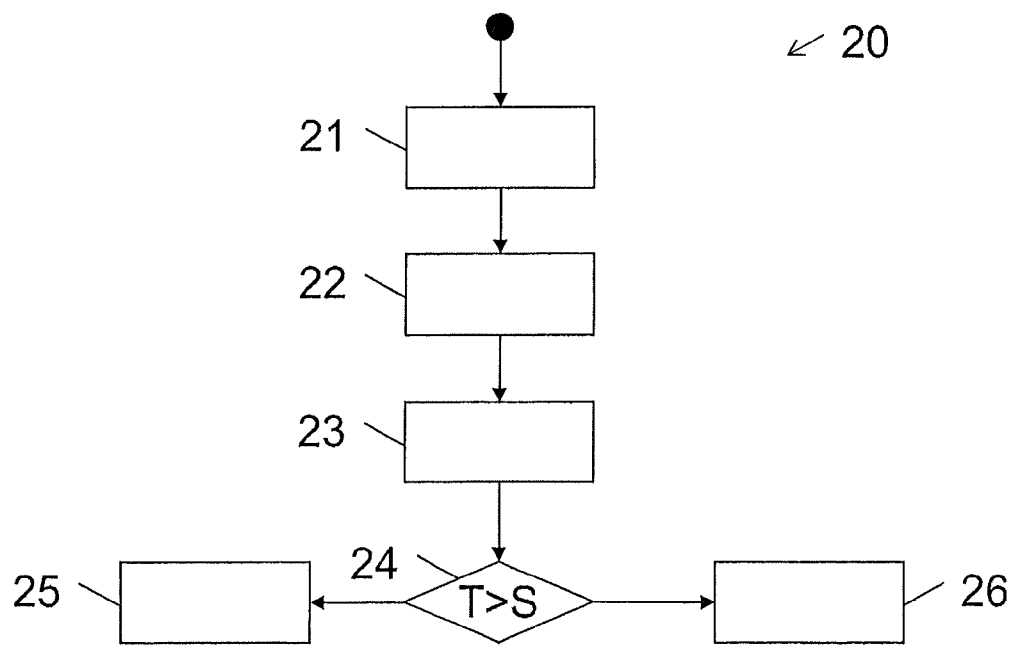
FIG. 2 shows a flowchart of an operating method according to a first example.

A method 20 according to FIG. 2, for example, is used to configure the start-up process of the computer system 10 as efficiently as possible.

A switch-on signal is detected in a first step 21. Detection of the switch-on signal can be, for example, physical application of a voltage to the computer system 10 or actuation of the push button 16 or other operating element.

Fundamental routines of a system firmware 18 are executed in a subsequent step 22. This involves, for example, execution of a boot block, initialization of the working memory 12 and subsequent loading of parts of the system firmware 18 from the non-volatile memory chip 13 into the working memory 12 of the computer system 10. These and similar operations are sometimes known as "early POST tasks."

Once the fundamental initialization of the computer system 10 has been completed, in a step 23, the length of time for which the push button 16 was depressed is determined. For that purpose, for example, a timer arranged in the input/output module 15 is queried.

In step 24, the operating period T determined in step 23 is compared to a predetermined time period S to call up a full boot sequence. The predetermined time period S should be chosen such that a user is able to differentiate between a short and long operation without difficulty. A normal push button depression generally lasts only a fraction of a second. Accordingly, a time period of several seconds, for example, one, two, three or four seconds is suitable as the predetermined time period S.

If it is determined in step 24 that the push button 16 was operated for a time period T shorter than the predetermined time period S, in step 25, further program code of the system firmware 18 is executed to start up the computer system. For example, in step 25, program code to initialize a hard disk controller can be executed and a boot loader or OS loader can be executed thereafter, to load the operating system 19 from the hard disk drive 14.

If, on the other hand, it is determined in step 24 that the push button 16 was operated for a time period T longer than the predetermined time period S, then in a subsequent step 26, a full boot sequence is executed. For example, a keyboard or other input component of the computer system 10 can be initialized. In addition, output components, for example, a graphics component of the computer system 10, can be activated. Alternatively or additionally, an expanded self-test such as, for example, a memory test of the computer system, can be carried out. Finally, a settings dialogue of the system firmware can also be called up and displayed.

Using the operating method 20 illustrated in FIG. 2, it is possible to choose between two different boot sequences of the computer system by operating the operating element for different lengths of time. In particular, a limited boot sequence for rapid start-up of the computer system or a full boot sequence for maintenance purposes can be chosen. Querying of the push button 16 and determination of the operating duration thereof can preferably be carried out by the system-related input/output module 15 and, for example, by a timer arranged therein. No communication is therefore needed with a possibly external keyboard of the computer system 10 so that, in particular, there is no need for a previous initialization of the keyboard or other components.

Figure 3:
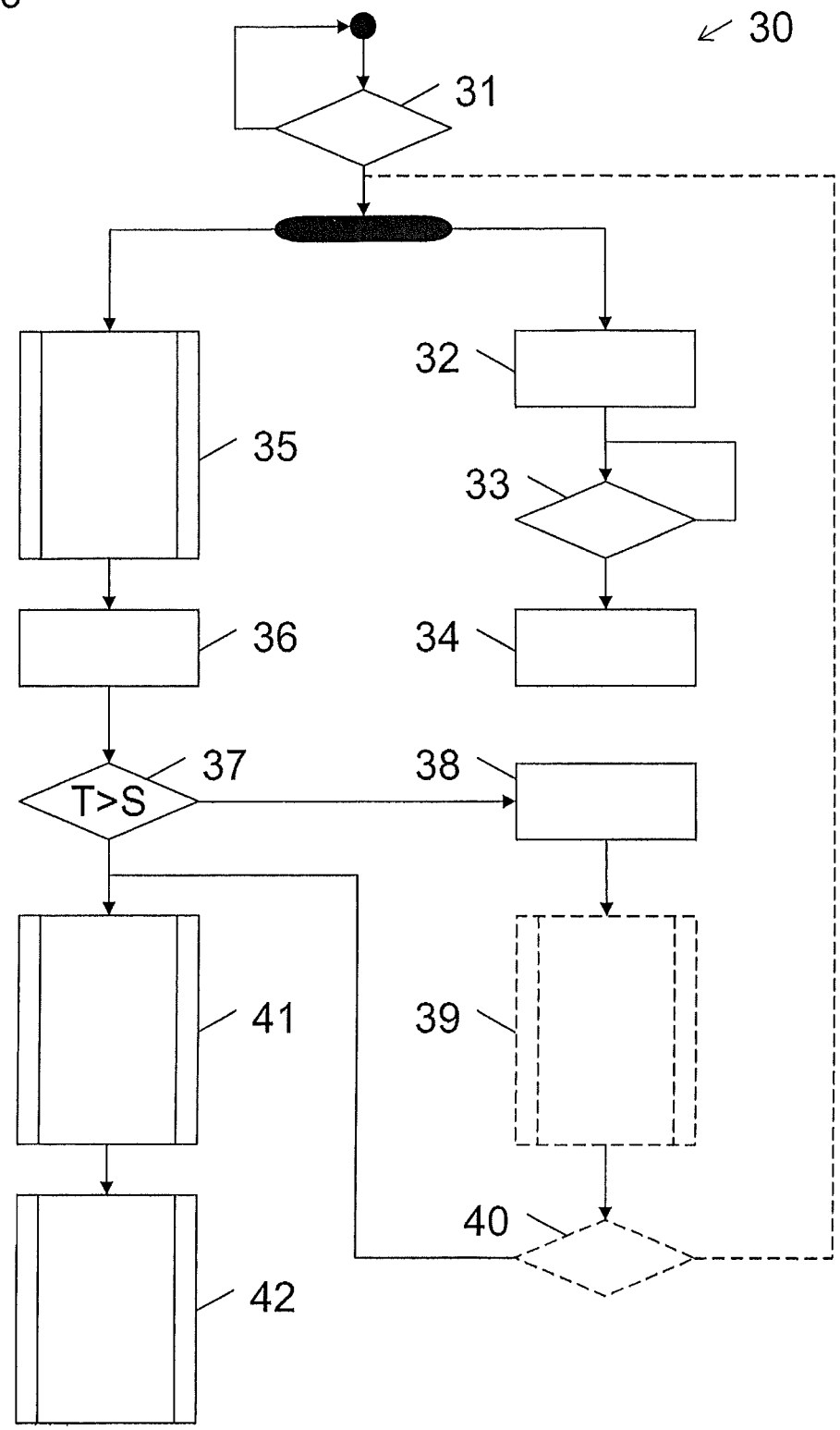
FIG. 3 shows a flowchart of an operating method according to a second example.

FIG. 3 shows a flow-chart according to a further operating method 30 of starting up the computer system 10.

After applying a power supply to the computer system 10, this is initially in a standby mode. A check is made to determine whether the push button 16 was depressed in a step 31. If this is not the case, the computer system 10 continues to remain in the standby mode.

Otherwise, if the push button 16 was depressed, a timer is started in step 32. The timer may be, for example, a timer of the input/output module 15 or a timer of what is commonly called a real-time clock module (RTC) of the computer system 10. In a subsequent step 33, a check is made to determine whether the push button 16 was released. If this is not the case, the test 33 is continued until release of the push button 16 is recognized. In step 34, after recognizing that the push button 16 has been released, the timer is stopped. Optionally, after a predetermined time period to call up the full boot sequence has been exceeded, a short signal can be generated to indicate to a user that there is no need to operate the push button 16 any longer to call up the full boot sequence. For example, an LED used to signal the ON-state can be switched briefly off and on again or a short acoustic signal can be emitted via a system loudspeaker.

Parallel to the steps 32 to 34, in a process 35 a first initialization phase of the computer system 10 is run through. For example, during the first initialization phase 35, the type of a processor and the type and size of a working memory 12 are determined. Other fundamental functions as well such as, for example, copying the system firmware 18 from the non-volatile memory chip 13 into the working memory 12 can be carried out in the process 35.

In the example described, the process 35 lasts at least as long as the predetermined time period S to activate the full boot sequence. In the subsequent step 36, it is thus possible to determine whether the push button 16 was operated for a time period T longer that the predetermined time period S. For that purpose in step 36, for example, a value of the timer is read out or a difference between a stop time determined in step 34 and a start time determined in step 32 is determined. If the push button 16 is still depressed as step 36 is being executed, the predetermined time period S has in any case been exceeded. In that case, for example, the time period since depression of the push button 16 or a predetermined maximum value can be set as the operating period T.

A check is made to determine whether the time period T called up in step 36 is greater than the predetermined time period S in step 37. If this is the case, in a step 38, program code of the system firmware 18 that is not absolutely necessary to boot the computer system 10 is executed. For example, this enables a keyboard or other input component to be initialized. By activating a specific graphics mode of a graphics component is it possible, for example, to indicate the result of an extended self-test.

A settings dialogue of the system firmware 18 is additionally executed by the processor 11 in an optional process 39. For example, after operating a previously displayed key combination, a settings screen to carry out fundamental low-level defaults for the computer system 10 can be displayed on a monitor of the computer system 10 and be manipulated by a user. Alternatively, the settings dialogue is automatically called up when the full boot sequence has been selected by way of a long-duration operation of the push button 16.

A user of the computer system 10 can determine, for example, the boot sequence of the computer system 10 with the settings dialogue. Other setting options known per se of system firmware 18 are also possible. Furthermore, the length of the predetermined time period S can optionally also be defined in the settings dialogue. If the user has completed or discarded his changes, in step 40 a check is made to determine whether a re-start of the computer system 10 is required to activate the possibly altered system settings. If this is the case, the method according to step 31 is continued.

If in step 37 it was recognized that the push button 16 was operated only for a comparatively short time period, or if in step 40 it was established that no re-start is required, in a process 41 further program code of the system firmware 18 required to boot the computer system 10 is executed. For example, part of the system firmware 18 can be executed to initialize an interface module of a mass storage medium.

After successful execution of all firmware components required to start the operating system 19, in a process 42, the operating system 19 of the computer system is loaded in a manner known per se. For example, the operating system 19 of the hard disk drive 14 of the computer system 10 can be loaded into the working memory 12 and executed by the processor 11.

In the above-described operating method, an operating element, in particular, an on-off push button 16 of the computer system 10 is used in an additional manner to simplify and accelerate a start-up procedure of the computer system 10. If, after starting the computer system, 10 the on-off button is depressed for a further time period S of, for example, 1 to 2 seconds, then the system firmware 18 recognizes that the user wishes to run the full boot sequence of the computer system 10 during this start-up procedure. In this case, the system firmware 18 executes program code for complete initialization and/or testing of the computer system 10. Otherwise, only a part of the system firmware 18 required for the accelerated start-up of the computer system 10 is executed. For example, initialization of a keyboard and provision of a separate waiting time to query a key combination to call up a settings dialogue can be dispensed with.

FIG. 4 shows two boot sequences, a full boot sequence 43 on the left and a limited boot sequence 44 on the right.

The full boot sequence 43 comprises execution of a first firmware component 18A to initialize the processor 11 and the working memory 12. Subsequently, a second firmware component 18B to initialize an input component is executed, for example, a driver module to query a USB keyboard and/or USB mouse. Following that, a third firmware component 18C to initialize an output component is executed. For example, a text mode or a VGA mode of a graphics card is activated. Then, a self-test of the working memory 12 or of other components of the computer system 10 is executed by a firmware component 18D. The firmware component 18E carries out, for example, a settings dialogue or the selection of a boot medium. A last firmware component 18F initiates a re-loading of the operating system 19 from a mass storage medium.

The limited boot sequence 44 comprises merely the execution of the system firmware components 18A and 18F followed by boot-up of the operating system 19. An initialization of components of the computer system 10 such as, for example, a USB controller or a graphics component, is here effected by operating system-specific driver modules, which are in any case loaded as part of the operating system 19.

As is clear from the illustration of FIG. 4, the start-up procedure of the computer system 10 can be shortened by using the limited boot sequence 44. After a start-up of the computer system 10 at a first time $T_0$, and execution of the first firmware component at a second time $T_1$, a decision is made as to whether the full boot sequence 43 or the limited boot sequence 44 is to be carried out.

The invention claimed is:

1. An operating method for a computer system having system firmware and an operating element that can be depressed and released to switch on the computer system comprising:
    monitoring the operating element for a depression thereof;
    immediately after starting a depression of the operating element, performing a first part of a boot sequence comprising executing fundamental routines of the system firmware, the fundamental routines comprising early POST tasks including working memory initialization,
    determining a time period (T) between starting the depression and releasing the operating element, the determination is carried out after completing the first part;
    executing a remaining part of full boot sequence with the system firmware if the determined time period (T) exceeds a predetermined time period (S), where the full boot sequence comprises at least one of activation of a keyboard and mouse of the computer system through the firmware; and
    executing a remaining part of limited boot sequence with the system firmware if the determined time period (T) does not exceed the predetermined time period (S), wherein the limited boot sequence does not comprise at least one of activation of a keyboard and mouse of the computer system through the firmware,
    wherein the first part of the boot sequence lasts at least as long as the predetermined time period (S).

2. The operating method according to claim 1, wherein performing the first part of the boot sequence comprises at least one of execution of a boot block, and loading of parts of the system firmware from a non-volatile memory chip into the working memory of the computer system.

3. The operating method according to claim 1, wherein executing the remaining part of the full boot sequence comprises executing a second part and a third part of the full boot sequence and executing the remaining part of the limited boot sequence comprises executing either only the second part or the third part of the full boot sequence.

4. The operating method according to claim 1, further comprising activating an output component of the computer system selected from a light-emitting diode or an acoustic signal generator if the operating element has been operated for the predetermined time period (S).

5. The operating method according to claim 1, wherein the full boot sequence comprises display of a key combination and a settings screen after actuation of the previously displayed key combination has been recognized.

6. The operating method according to claim 1, wherein if the operating element is actuated, the computer system is started by applying a supply voltage to the components of the computer system.

7. The operating method according to claim 1, wherein performing the first part of a boot sequence comprising executing the fundamental routines of the system firmware comprises at least early POST tasks including executing a boot block and loading parts of the system firmware from non-volatile memory chip into the working memory of the computer system.

8. The operating method according to claim 1, wherein a timer is started after staring an actuation of the operating element and a subsequent check is made to determine whether the operation element has been released and the check is continued until release of the operation element is recognized and, when release of the operation element is recognized, the timer is stopped, determining the time period (T).

9. The operating method according to claim 8, wherein the first part of the boot sequence comprising executing fundamental routines of the system firmware is performed parallel to starting the timer, checking whether the operating element has been released and stopping the timer, determining the time period (T).

10. An operating method for a computer system having system firmware and an operating element that can be depressed and released to switch on the computer system comprising:
    monitoring the operating element for a depression thereof;
    executing a first part of a full boot sequence, comprising executing fundamental routines of the system firmware, immediately after the start of a depression of the operating element, the full boot sequence comprising the first part, a second part and a third part of a boot sequence, the fundamental routines comprising early POST tasks including working memory initialization;
    determining a time period (T) between starting the depression and releasing the operating element;
    executing the remaining parts of the full boot sequence with the system firmware if the determined time period (T) exceeds a predetermined time period (S); and
    executing a limited boot sequence, comprising either the second or the third part of the full boot sequence, with the system firmware if the determined time period (T) does not exceed the predetermined time period (S), wherein the first part of the full boot sequence lasts at least as long as the predetermined time period (S) and determining the time period (T) is carried out after completion of the first part.

11. The operating method according to claim 10, wherein the full boot sequence comprises an initialization of at least one input component of the computer system selected from activation of a keyboard and/or mouse, and in which the limited boot sequence does not include initialization of the at least one input component.

12. The operating method according to claim 10, wherein after completion of the first part, the second part and the third part of the full boot sequence are executed if the determined time period (T) exceeds the predetermined time period (S), and either only the second or only the third part of the full boot sequence is executed as part of the limited boot sequence if the determined time period (T) does not exceed the predetermined time period (S).

13. The operating method according to claim 10, further comprising activating an output component of the computer system selected from a light-emitting diode or an acoustic signal generator if the operating element has been operated for the predetermined time period (S).

14. The operating method according to claim 10, wherein the full boot sequence comprises display of a key combination and a settings screen after actuation of the previously displayed key combination has been recognized.

15. The operating method according to claim 10, wherein if the operating element is actuated, the computer system is started by applying a supply voltage to the components of the computer system.

16. A computer system comprising:
an operating element that can be depressed and released to switch on the computer system;
a monitoring circuit that monitors at least the one operating element for a depression thereof;
at least one non-volatile memory that stores system firmware comprising first executable program code; and
at least one data processing device that executes executable program code, wherein a first subset of the executable program code that executes a full boot sequence of the computer system by the data processing device is executed if the monitoring circuit indicates that the operating element was depressed and then released after a predetermined time period (S), a second subset of the executable program code that executes a limited boot sequence of the computer system by the data processing device is executed if the monitoring circuit indicates that the operating element was depressed and then released after a time period (T) shorter than the predetermined time period (S), and wherein immediately after the start of the depression of the operating element, a first part of the full boot sequence and the limited boot sequence comprising fundamental routines of the system firmware is executed, executing the first part of the full boot sequence lasts at least as long as the predetermined time period (S), and determining the time period (T) is carried out after completion of the first part, the fundamental routines comprising early POST tasks including working memory initialization.

17. The computer system according to claim 16, further comprising a general-purpose input/output module, wherein an input connection of the input/output module connects to a push button to switch on the computer system and the input/output module monitors the push button for actuation.

18. The computer system according to claim 17, further comprising a timer, wherein the timer is started when the push button is depressed and stopped when the push button is released to determine the time period (T) of the operating element.

19. The computer system according to claim 16, wherein the system firmware comprises a BIOS firmware or a UEFI firmware.

20. The computer system according to claim 16, wherein duration of the predetermined time period (S) is adjustable via a settings dialogue of the system firmware.

21. The computer system according to claim 16, wherein the full boot sequence comprises display of a key combination and a settings screen after actuation of the previously displayed key combination has been recognized.

22. The computer system according to claim 16, wherein if the operating element is actuated, the computer system is started by applying a supply voltage to the components of the computer system.

* * * * *